United States Patent [19]

Woog

[11] Patent Number: 4,497,658
[45] Date of Patent: Feb. 5, 1985

[54] COMPACT PRECIOUS METAL FURNACE AND RECOVERY METHOD

[76] Inventor: Manfred J. Woog, 1960 B. St., Craig, Colo.

[21] Appl. No.: 540,441

[22] Filed: Oct. 11, 1983

[51] Int. Cl.³ .............................................. C22B 11/12
[52] U.S. Cl. ........................................ 75/83; 266/214; 266/240; 222/604; 432/157
[58] Field of Search .................... 75/63, 65, 79, 83; 266/200, 207, 217, 214, 240, 242, 275, 276, 900, 901; 432/157; 222/604

[56] References Cited

U.S. PATENT DOCUMENTS

| | | | |
|---|---|---|---|
| 486,613 | 11/1892 | Langguth | 266/214 |
| 792,642 | 6/1905 | Williams | 266/217 |
| 2,828,516 | 4/1958 | Black et al. | 266/276 |
| 3,372,993 | 3/1968 | Brown | 75/65 R |
| 3,970,444 | 7/1976 | Brotzmann et al. | 75/46 |
| 4,404,022 | 9/1983 | Godbehere | 75/83 |

Primary Examiner—M. J. Andrews
Attorney, Agent, or Firm—Arnold B. Silverman

[57] ABSTRACT

A highly compact and efficient tilting crucible furnace and smelting method is disclosed for use in the direct smelting of a precious metal containing material. A furnace body having a refractory lined cavity which has a top opening is pivotally mounted on a support frame to allow tipping thereof. A cover having a first opening to receive a gas burner and a second multi-purpose opening therein is rigidly attached to the body. A gas burner attached to the cover provides a downwardly directed oxidizing flame into the cavity to oxidize iron which is added to the cavity and other impurities in the precious metal containing material. A flux is provided to provide a thoroughly liquid mixture and after heating, the molten mass is poured through the multi-purpose cover opening into a mold. As the mold cools, a doré button of precious metal settles to the bottom of the mold and slag containing impurities forms on the top.

8 Claims, 3 Drawing Figures

COMPACT PRECIOUS METAL FURNACE AND RECOVERY METHOD

BACKGROUND OF THE INVENTION

1. Field of the Invention

This invention relates to tilting crucible furnaces. More specifically, a compact and highly efficient reverberatory furnace and recovery method are disclosed for direct smelting of a precious metal containing material into a doré button of precious metal.

2. Description of the Prior Art

It is well known in the art to provide crucible furnaces for smelting small batches of non-ferrous metals. In those devices, the charge is melted in a refractory or metal pot which may be fired either by external means or internally as by gas or oil burners, for example. In the past, small furnaces were typically fixed and the pot had to be removed for pouring. This removal increases the risk of mechanical and thermal damage to the pot. Larger tilting furnaces which have integral refractory pots are, however, known.

It is also known, that use of a reverberatory furnace, i.e., one in which the flame directly contacts the charge, is desirable in order to increase the oxidation of impurities in the charge.

In the smelting of silver, it is known that adding silicates to the charge can aid in providing easily fusible slag. Inclusion of soda-ash, fluorspar, and borax are also known to be beneficial in the production of a thoroughly liquid slag. Addition of nitre is known to be helpful in the partial oxidation of sulfides.

As mentioned above, the only known tilting furnaces are relatively large and would, therefore, not be economical for the recovery of small quantities of precious metal. There is, therefore, a need for a tilting reverberatory furnace of relatively small dimension which is efficient to use in the recovery of precious metals.

SUMMARY OF THE INVENTION

A highly compact and efficient reverberatory crucible furnace is provided. The furnace cavity is utilized directly as a crucible thereby eliminating the need for a separate crucible. This allows easy introduction of fire directly on the charge. A controlled fuel mixture of liquid propane and air provides sufficient oxygen for oxidation and separating of the ore. A rigidly attached furnace lid having a central burner port and a permanently opened multi-purpose exhaust throat therein provides uniform heat on the charge and allows for both the escape of exhaust gases and the input of the charge material. Removal of the molten mass is accomplished by tilting the entire furnace thereby allowing the molten mass therein to pass through the exhaust throat into a mold for cooling. The silver or other precious metals settles on the bottom of the mold in the form of a doré button, leaving the slag above it. A preferred method of use is also disclosed.

It is an object of the present invention to provide a crucible furnace of relatively small dimensions for use in the recovery of precious metals.

It is an object of the invention to provide a compact furnace which does not require use of a separate crucible.

It is another object of this invention to provide a furnace which is highly efficient and economical to use.

It is yet another object to provide a furnace which may be tilted to remove the contents therefrom.

It is yet another object to provide a furnace having a reverberatory design to facilitate proper oxidation and separation of the ore.

It is yet another object of the present invention to provide a cover having a burner therein for directing an oxidizing flame downwardly on the charge.

It is still another object of the present invention to provide a furnace having an attached cover with a permanently open exhaust throat therein to allow for the entry of raw materials and for the subsequent pouring of the molten charge.

It is yet another of the present invention to provide a flux for use in the smelting of silver.

It is another object of the present invention to provide a method for using the above mentioned furnace in the smelting of a silver containing material.

These and other objects of the present invention will be more fully understood from the following description of the invention on reference to the illustrations appended hereto.

DESCRIPTION OF THE PREFERRED EMBODIMENTS

Figure 1:
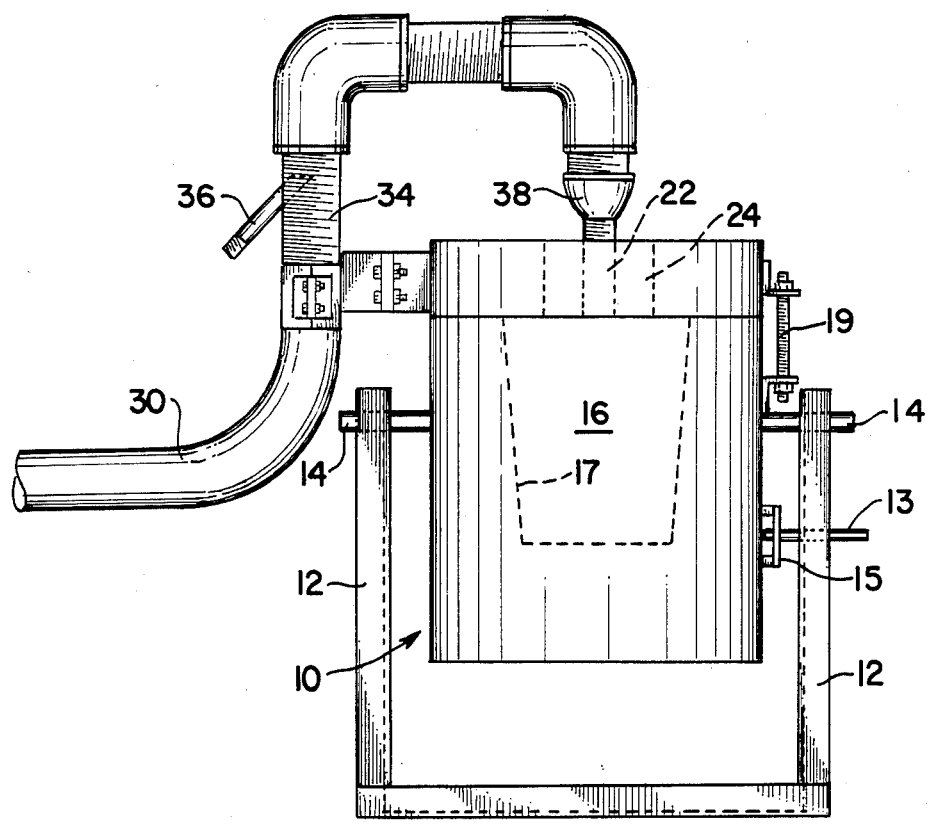
FIG. 1 is a front elevational view of the furnace of the present invention.

Referring more specifically to FIG. 1, a compact and highly efficient crucible furnace is shown. This furnace can be used either for direct smelting of precious metal containing ore or for smelting of metallic replacement cartridges and ion exchange columns which are used in the silver recovery industry.

The furnace will directly smelt the material into a doré button of silver or other precious metal and operates through a oxidizing principle.

Figure 3:
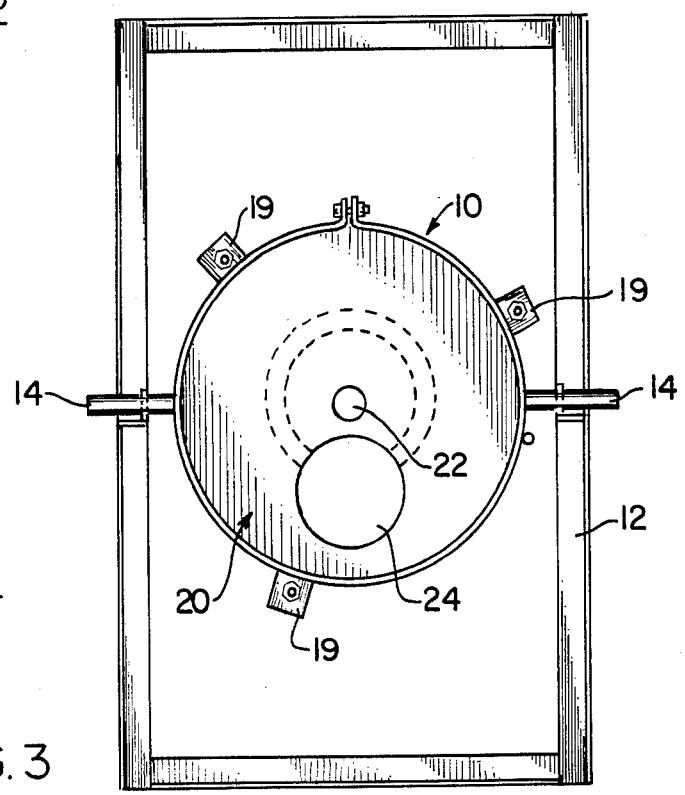
FIG. 3 is a top plan view of the furnace of FIG. 1 having the burner removed.

The furnace has a body 10 which is generally cylindrical in shape and is preferably fabricated from mild steel or cast iron. The body is supported on a angle iron frame 12 as shown, by pivot pins 14. This mounting arrangement allows the entire furnace body to be tilted about the pivot pins 14. To prevent the furnace body from tipping beyond a desired angle, a tilt stop 15, which cooperates with pin 13, is provided along at least one side of the furnace body as shown. The top of the furnace body has a cavity 16 therein which is illustrated by chain line 17. This cavity serves as a crucible for the smelting process and, therefore, eliminates the need for a separate crucible. As crucibles are quite expensive and have a very limited life span, this furnace provides a more economical means of smelting precious metal ore into a relatively pure form. Cavity 16 is preferably lined with a suitable refractory material to insulate the furnace body 10 from the heat of the smelting process. A cover or lid 20 which is also preferably fabricated from mild steel or cast iron is rigidly attached to the body of the furnace to provide a closure for cavity 16. A suitable refractory material may also be provided. The cover 20 has a small opening 22 which in the form shown is centered therein to receive a gas burner which provides a means to fire the charge within cavity 16. The gas burner (not shown) forces a gas flame downwardly through opening 22 into the vessel 16. The oxygen rich flame ricochets off the charge within the cavity and exits along with exhaust gases through multi-purpose exhaust throat 24. Throat 24, as best shown in FIG. 3, is positioned in front of the center opening 22. The cover 20 is rigidly secured to the body 10 of the furnace by any suitable securing means 19.

To provide a highly efficient fuel mixture, a large volume of air is transferred to the burner manifold area 34 by a large flexible metal tube 30. Liquid propane gas is mixed with the air by means of ventura 36 in the manifold area. The mixture is passed through a small burner port 38 to provide a high velocity flame. Reverberating this oxygen rich flame off of the charge causes the oxidation of iron and other impurities which are present in the charge.

Figure 2:
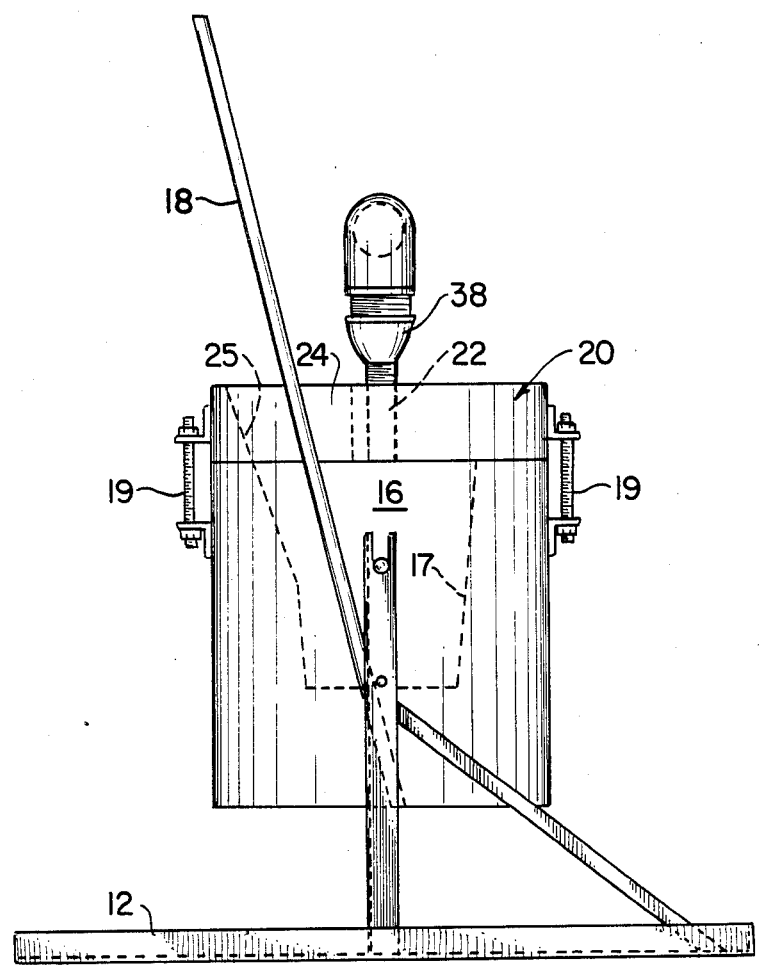
FIG. 2 is a side elevational view of the furnace of FIG. 1 showing the pivotal mounting of the furnace body on its frame.

Referring now to FIG. 2, a side elevational view of the furnace is shown. From this angle, a tipout handle 18 is shown as attached to body 10 of the furnace. To pour the molten contents of the cavity 16, the tipout handle 18 is pulled downwardly causing the molten material to pour out of multi-exhaust throat 24. The edge surface 25 of exhaust port 24 is provided at an angle which cooperates with cavity 16 to serve as a spout for pouring. The furnace body 10 shown has a diameter of only about 23 to 24 inches and a height including the lid of only about 28 to 30 inches. It will be obvious, therefore, to those skilled in the art, that a highly compact furnace is disclosed. This type of furnace because of its reduced size and integral crucible is highly efficient for the recovery of precious metals.

FIG. 3 shows a top plan view of the furnace as described in the previous figures. FIG. 3 illustrates that the supporting frame member 12 has a generally rectangular base. FIG. 3 also illustrates the position of multi-purpose exhaust throat 24 which serves as an escape for the exhaust fumes and flames, as an input for materials to be smelted into the charge and as a spout for removing molten metal from the cavity.

The following is a description of the present preferred method of utilizing the furnace for smelting is a silver containing ion exchange column of the type generally used in the silver industry. The first step is to ignite the furnace burner and to allow the furnace to warm up to a temperature of approximately 2600° to 2700° F. This warmup procedure takes approximately 1 hour or less to complete. Next an ion exchange column is added to the cavity through exhaust port 24. As mentioned above, the ion exchange column comprises fiberglass, iron, iron oxides, sulfides and silver. Next approximately six pounds of scrap iron pieces are added to the furnace to provide an oxidizing exchange material. A flux comprising borax, soda ash, nitre, fluorspar and silica is then added to the furnace to provide a thoroughly liquid mixture and to aid in the oxidation process. After each of the above materials have been added to the furnace an oxidizing flame is allowed to richochet off the charged mass for approximately fifteen to twenty-five minutes. During this time the furnace is intermittently rocked or vibrated to insure that the ingredients are adequately mixed. Once the mass within the cavity has reached an appropriately low viscosity, the mass is poured through the exhaust throat into a preheated mold. As the molten mass cools a slag containing most of the impurities forms on the top of the mold and a doré button of silver settles to the bottom. Once the mold has cooled sufficiently, the mold is tipped and the button is knocked off and the recovery process is complete. Cooling typically takes ten to fifteen minutes.

As mentioned above, it is also contemplated that the furnace could be used to smelt ion exchange columns and metallic replacement cartridges which contains silver or other precious metals. In one type of replacement cartridge, a spiral mass of fiberglass having iron particles dispersed therein is utilized to recover silver from certain silver containing solutions by means of a replacement reaction. With this type of cartridge, the fiberglass mass which contains particles of silver can be added directly to the furnace with the scrap iron. The fiberglass in this case acts as a flux to provide a thoroughly liquid mass.

Whereas particular embodiments of the invention have been described above for the purpose of illustration, it will be appreciated by those skilled in the art that numerous variations of the details may made without departing from the invention described in appended claims.

I claim:

1. A precious metal recovery furnace comprising:
   (a) a support frame;
   (b) a furnace body pivotally mounted on said frame to allow tipping thereof, said body having a refractory lined cavity which has a top opening;
   (c) a furnace cover substantially rigidly secured to the body providing a cover for the cavity, said cover having a first opening therein sized to receive a gas burner and having a second opening therein spaced from said first opening to provide an escape for exhaust gases and flames and to provide means to input material into said cavity and to provide pouring means for removing molten contents of the cavity by tipping said body;
   (d) a gas burner mounted to said cover in a manner so as to provide a downwardly directed oxidizing flame into said cavity; and
   (e) means to provide air and gas to said burner.

2. A furnace according to claim 1 wherein said frame includes means to prevent said body from tipping beyond a desired angle.

3. A furnace according to claim 1 wherein said furnace body and attached lid are generally cylindrical in shape having an outside height dimension not greater than 30 inches and a diameter not greater than 25 inches.

4. A furnace according to claim 1 wherein said cavity is generally cylindrical in shape having a depth not greater than 20 inches and a diameter not greater than 15 inches.

5. A furnace according to claim 1 wherein the second opening in the furnace lid is generally circular and has a diameter of not greater than 8 inches.

6. A method of smelting a silver containing material in a furnace of the type comprising a compact furnace body pivotally mounted on a frame to allow tipping thereof, and having a refractory lined cavity therein, a furnace cover secured to said body having a first opening therein to receive a gas burner and a second multi-purpose opening therein, a gas burner attached to said cover to provide a downwardly directed oxidizing flame into the cavity and a means to provide air and gas to said burner comprising the steps of:
   (a) igniting the furnace;
   (b) allowing the cavity to reach a temperature of at least 2600° F.;

(c) adding a silver containing material to the cavity through the multi-purpose opening;
(d) adding scrap iron to the cavity through the multi-purpose opening;
(e) adding a flux to the cavity through the multi-purpose opening;
(f) providing an oxidizing flame to ricochet off of and melt the materials in the cavity;
(g) intermittently rocking the furnace to insure the contents of the cavity are well mixed;
(h) pouring the molten mixture through the multi-purpose opening into a preheated mold; and
(i) allowing the silver to settle to bottom of the mold as the mixture cools to form a doré button.

7. A method according to claim 6 wherein said flux includes borax, soda ash, nitre, fluorspar and silicon.

8. A method according to claim 6 wherein said oxidizing flame ricochets off of the materials in the cavity for approximately 15 to 25 minutes.

* * * * *